(12) United States Patent
Narayanan

(10) Patent No.: US 10,212,089 B1
(45) Date of Patent: Feb. 19, 2019

(54) ENCAPSULATING TRAFFIC ENTROPY INTO VIRTUAL WAN OVERLAY FOR BETTER LOAD BALANCING

(71) Applicant: Citrix Systems, Inc., Fort Lauderdale, FL (US)

(72) Inventor: Mahesh Narayanan, San Jose, CA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

(21) Appl. No.: 15/711,336

(22) Filed: Sep. 21, 2017

(51) Int. Cl.
| | |
|---|---|
| *H04L 12/28* | (2006.01) |
| *H04L 12/803* | (2013.01) |
| *H04L 12/743* | (2013.01) |
| *H04L 12/715* | (2013.01) |
| *H04L 12/46* | (2006.01) |
| *H04L 12/771* | (2013.01) |
| *H04L 12/931* | (2013.01) |

(52) U.S. Cl.
CPC ........ *H04L 47/125* (2013.01); *H04L 12/4633* (2013.01); *H04L 45/64* (2013.01); *H04L 45/7453* (2013.01); *H04L 45/56* (2013.01); *H04L 49/70* (2013.01)

(58) Field of Classification Search
CPC . H04L 12/4633; H04L 45/54; H04L 45/7453; H04L 47/125
USPC .......... 370/389–410; 709/231–231, 236–237
See application file for complete search history.

(56) References Cited

U.S. PATENT DOCUMENTS

| | | | | |
|---|---|---|---|---|
| 9,923,798 B1* | 3/2018 | Bahadur | ................. | H04L 45/00 |
| 10,033,602 B1* | 7/2018 | Russell | ................... | H04L 43/06 |
| 10,044,581 B1* | 8/2018 | Russell | ................... | H04L 43/08 |
| 2005/0213570 A1* | 9/2005 | Stacy | ...................... | H04L 47/32 |
| | | | | 370/389 |
| 2009/0303880 A1* | 12/2009 | Maltz | ...................... | H04L 45/02 |
| | | | | 370/235 |
| 2009/0307334 A1* | 12/2009 | Maltz | ................ | H04L 29/12028 |
| | | | | 709/219 |
| 2010/0214913 A1* | 8/2010 | Kompella | ............. | H04L 45/125 |
| | | | | 370/230 |
| 2010/0306408 A1* | 12/2010 | Greenberg | .......... | H04L 12/4633 |
| | | | | 709/238 |
| 2015/0124828 A1* | 5/2015 | Cj | ....................... | H04L 12/4633 |
| | | | | 370/392 |

(Continued)

*Primary Examiner* — Thai D Hoang
(74) *Attorney, Agent, or Firm* — Foley & Lardner LLP; Christopher J. McKenna

(57) ABSTRACT

Disclosed embodiments describe systems and methods for tunneling packets. A tunnel between a first intermediary device and a second intermediary device is established that encapsulates payload packets of transport layer connections between a client and a server. The first intermediary device identifies, from a first packet of a transport layer connection between the client and the server, packet header information. The first intermediary device populates a destination port and a source port of a header of a second packet to be transmitted via the tunnel. The destination port is populated with a predetermined destination port, and the source port includes a first hash of a tuple of the packet header information of the first packet. The second packet includes the first packet as a payload, and is load balanced across paths to the second intermediary device based on a second hash of the header of the second packet.

20 Claims, 10 Drawing Sheets

(56) References Cited

U.S. PATENT DOCUMENTS

| | | | |
|---|---|---|---|
| 2015/0254347 A1* | 9/2015 | Mosko | G06F 17/30864 370/392 |
| 2016/0028708 A1* | 1/2016 | Guthery | H04L 63/04 726/1 |
| 2016/0261492 A1* | 9/2016 | Xiao | H04L 41/0686 |
| 2017/0244637 A1* | 8/2017 | Singhal | H04L 45/7453 |
| 2018/0046667 A1* | 2/2018 | Wood | G06F 17/30312 |

* cited by examiner

ENCAPSULATING TRAFFIC ENTROPY INTO VIRTUAL WAN OVERLAY FOR BETTER LOAD BALANCING

FIELD OF THE DISCLOSURE

The present application generally relates to methods and systems for tunneling packets between intermediary devices.

BACKGROUND

Networking devices can perform load balancing of network traffic using one or more load balancing techniques. For example, the networking device can parse a packet header and calculate a hash. The networking device can select a network path based on the hash, and then use the selected path to direct the packet.

Networks can further utilize encapsulation techniques to provide an overlay tunnel or virtual path for network traffic between networking devices. However, network traffic that arrives via the overlay tunnel may include packets with the same or similar packet header information. Since these packets have the same or similar header information, networking devices that perform load balancing by calculating a hash of the packet header can polarize network traffic on a particular path. Thus, the technical challenges of load balancing network traffic that arrives via an overlay tunnel can lead to polarization of the network traffic on a particular path, thereby resulting in overutilization of certain paths or links and causing network delay, latency, or packet loss.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed to systems and methods for tunneling packets between intermediary devices to be transmitted across different paths. In a networking environment, networking devices, such as devices intermediary to a client and a server, can provide a wide area network or a software-defined wide area network ("SD-WAN"). An SD-WAN can provide a layer of abstraction from the underlying WAN links in the network service provider's network by encapsulating network traffic in an overlay tunnel (or virtual path).

The overlay can use virtual internet protocol addresses ("VIPs") or tunnel end-points configured on each SD-WAN device (e.g., branch appliances or master control node ("MCN")). The intermediary device configured to provide a SD-WAN can insert a source and destination user datagram port ("UDP") set to a predetermined value (e.g., 4980). However, the disadvantage of setting the UDP to a predetermined value is that all traffic coming in from a LAN and flowing between a pair of networking sites is assigned the same packet header information (e.g., 6 tuple information), and hence the intermediate devices perform the same load balancing. This can lead to polarization of a customer's traffic on a particular path, hence leading to overutilization of certain links.

Thus, systems and methods of the present disclosure allow intermediary devices to capture the traffic entropy in the source port. The intermediary devices can capture LAN traffic flow information in the overlay headers so as to provide efficient load balancing over WAN and reduce, mitigate, or eliminate polarization of flows between sites. The intermediary devices can also capture LAN traffic flow information in the overlay headers in order to policy-based route it to a security zone for "cleaning" traffic or for compliance reasons. The intermediary devices can capture flow information, such as information in the IP header (e.g., source port). For example, when the intermediary devices parse a 5 tuple to calculate the hash, because the source ports are different (everything else may be the same because the network traffic is tunneled), the hash would be different and cause the load balancer to direct the traffic via different paths or links. Capturing the flow information in the overlay headers can allow for improved load balancing as opposed to creating multiple tunnels with different IP headers, which increases overhead and resource utilization.

To improve the performance of load balancing on network traffic in a tunnel overlay, an intermediary device of the present disclosure can analyze the network traffic ingress from the LAN, such as a 6 tuple of a packet header of that can include: Source-IP, Destination-IP, Source-Port, Destination-Port, Protocol and DSCP). For each unique packet header, the intermediary device can inserting a virtual path overlay header and add a default destination port, but add a different Source Port. Thus, the intermediary device can capture the flow data of a Layer-3 payload in the Source Port of the encapsulated packet.

The intermediary devices in the network, such as a network comprising core routers or edge routers maintained by a carrier or network service provider, can now identify that the source port is different for the different 6 Tuple packet flows from a site, and assign the packets a different load balancing treatment. Thus, instead of all traffic between two sites being treated as a single packet flow by the intermediate devices, the intermediary devices can now identify different 6 tuples and load balance accordingly.

Further, if there are routing domains configured between sites, the intermediary device can include Routing domain context while ascertaining the Source Port. This provides an additional level of capturing flow information. The intermediary device can, therefore, provide both packet flow separation between 2 sites as well as provide flow separation at a per routing-domain level. This can allow for differentiated load balancing even when the same traffic flows on different routing domains between the same two sites.

At least one aspect is directed to a method for tunneling packets between intermediary devices to be transmitted across different paths. The method includes establishing a tunnel between a first intermediary device and a second intermediary device. The first and second intermediary devices can be between one or more clients and one or more servers. The tunnel encapsulates as payload packets of transport layer connections between the one or more clients and the one or more servers. The first intermediary device receives a first packet of a transport layer connection between a client of the one or more clients and a server of the one or more servers. The first intermediary device identifies, from the first packet, a source internet protocol (IP) address, a source port, a destination IP address, a destination port, a protocol and a differentiated services field. The first intermediary device populates a destination port and a source port of a header of a second packet to be transmitted via the tunnel. The destination port is populated with a predetermined destination port, and the source port includes a first hash of the source IP address, the source port, the destination IP address, the destination port, the protocol and the differentiated services field. The second packet includes the first packet as a payload. The first intermediary device transmits the second packet to the second intermediary device. The second packet can be load balanced across a plurality of paths to the second intermediary device based on at least a second hash of the header of the second packet.

In some embodiments, the second intermediary device receives the second packet via a first path of the plurality of paths selected by a network device performing load balancing based on at least the second hash of the second packet.

The first intermediary device can identify a routing domain of the first packet. The first intermediary device can include the routing domain as input to the first hash. The first intermediary device can include the routing domain in the header of the second packet. The routing domain can identify a domain of an entity of a plurality of different entities having network traffic traversing between the first intermediary device and the second intermediary device.

In some embodiments, the first intermediary device can populate the header of the second packet with a second source IP address of the first intermediary device and a second destination IP address of the second intermediary device.

The header of the second packet can include a unigram data protocol (UDP) header. The protocol can include an internet protocol (IP) protocol. In some embodiments, packets via different transport layers connections between the client and the server that are transmitted from the first intermediary device via the tunnel are transmitted via different paths of the plurality of paths to the second intermediary device.

At least one aspect is directed to a system for tunneling packets between intermediary devices to be transmitted across different paths. The system can include a first intermediary device configured to establish a tunnel with a second intermediary device. The first and second intermediary device are configured to be intermediary to one or more clients and one or more servers. The tunnel encapsulates as payload packets of transport layer connections between the one or more clients and the one or more servers. The system can include one of a virtual server or a packet engine executable on one or more processors, coupled to memory, of the first intermediary device. The first intermediary device can execute one of the virtual server or the packet engine to receive a first packet of a transport layer connection between a client of the one or more clients and a server of the one or more servers. The first intermediary device can identify from the first packet a source internet protocol (IP) address, a source port, a destination IP address, a destination port, a protocol and a differentiated services field. The first intermediary device can populate a destination port of the header of a second packet to be transmitted via the tunnel with a predetermined destination port. The first intermediary device can populate a source port comprising a first hash of the source IP address, the source port, the destination IP address, the destination port, the protocol and the differentiated services field, the second packet comprising the first packet as a payload. The first intermediary device can transmit the second packet to the second intermediary device. The second packet can be load balanced across a plurality of paths to the second intermediary device based on at least a second hash of the header of the second packet.

In some embodiments, the second intermediary device is further configured to receive the second packet via a first path of the plurality of paths selected by a network device performing load balancing based on at least the second hash of the second packet.

In some embodiments, the first intermediary device is further configured to identify a routing domain of the first packet. The first intermediary device can include the routing domain as input to the first hash. The first intermediary device can include the routing domain in the header of the second packet. The routing domain can identify a domain of an entity of a plurality of different entities having network traffic traversing between the first intermediary device and the second intermediary device.

The first intermediary device can be further configured to populate the header of the second packet with a second source IP address of the first intermediary device and a second destination IP address of the second intermediary device.

The header of the second packet comprises a unigram data protocol (UDP) header. The protocol can include an internet protocol (IP) protocol. In some embodiments, packets via different transport layers connections between the client and the server transmitted from the first intermediary device via the tunnel are transmitted via different paths of the plurality of paths to the second intermediary device.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure can be repeated in one or more subsequent figures without additional description in the specification in order to provide context for other features, and not every element can be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents can be helpful:

Section A describes a network environment and computing environment which can be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for tunneling packets.

A. Network and Computing Environment

Figure 1A:
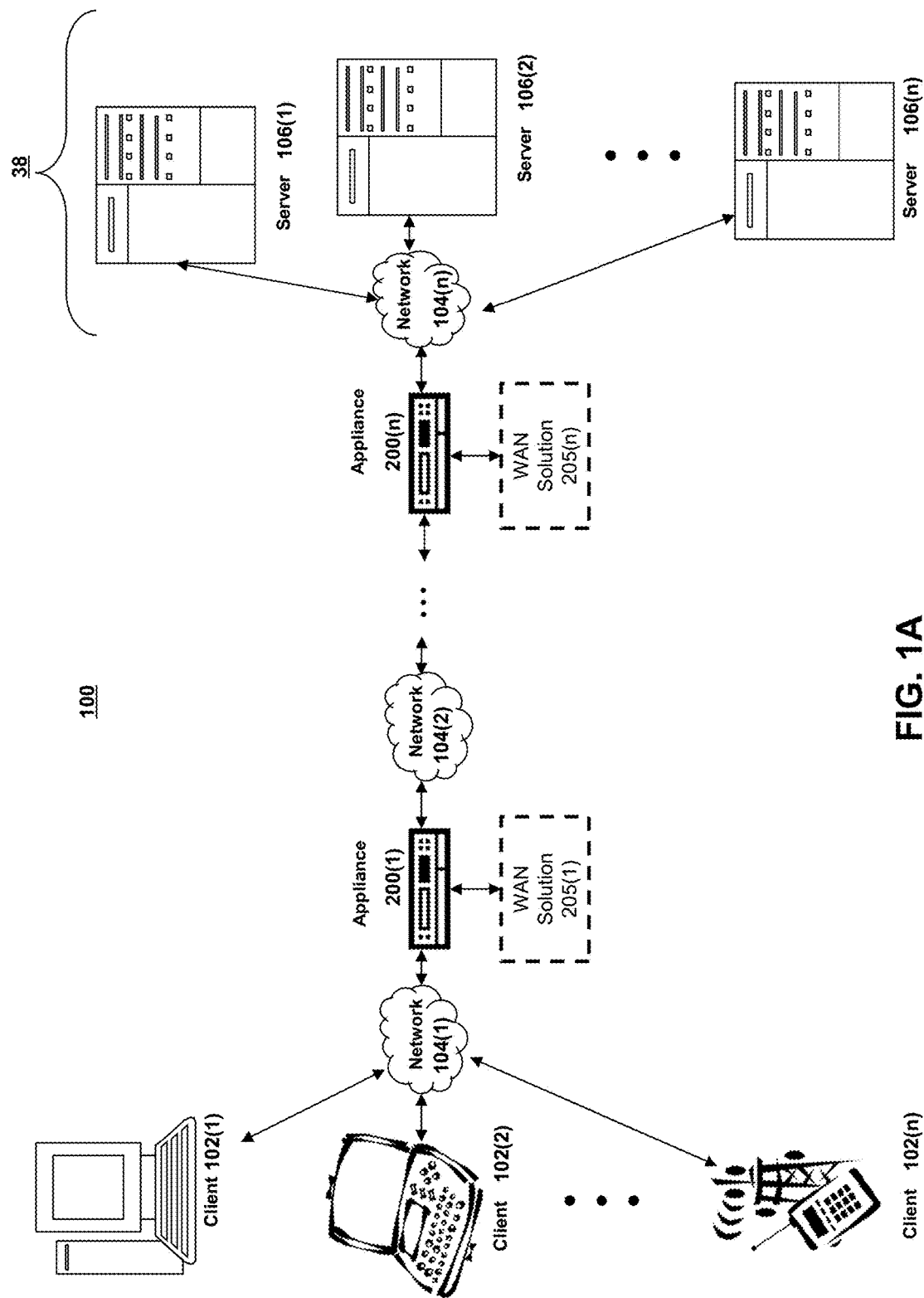
FIG. 1A is a block diagram of a network computing system, in accordance with an illustrative embodiment.

Referring to FIG. 1A, an illustrative network environment 100 is depicted. Network environment 100 can include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 can communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 can be on the same network 104. The various networks 104 can be the same type of network or different types of networks. For example, in some embodiments, network 104(1) can be a private network such as a local area network (LAN) or a company Intranet, while network 104(2) and/or network 104(n) can be a public network, such as a wide area network (WAN) or the Internet. In other embodiments, both network 104(1) and network 104(n) can be private networks. Networks 104 can employ one or more types of physical networks and/or network topologies, such as wired and/or wireless networks, and can employ one or more communication transport protocols, such as transmission control protocol (TCP), internet protocol (IP), user datagram protocol (UDP) or other similar protocols.

As shown in FIG. 1A, one or more appliances 200 can be located at various points or in various communication paths of network environment 100. For example, appliance 200 can be deployed between two networks 104(1) and 104(2), and appliances 200 can communicate with one another to work in conjunction to, for example, accelerate network traffic between clients 102 and servers 106. In other embodiments, the appliance 200 can be located on a network 104. For example, appliance 200 can be implemented as part of one of clients 102 and/or servers 106. In an embodiment, appliance 200 can be implemented as a network device such as NetScaler® products sold by Citrix Systems, Inc. of Fort Lauderdale, Fla.

As shown in FIG. 1A, one or more servers 106 can operate as a server farm 38. Servers 106 of server farm 38 can be logically grouped, and can either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 can seek access to hosted applications on servers 106.

As shown in FIG. 1A, in some embodiments, appliances 200 can include, be replaced by, or be in communication with, one or more additional appliances, such as WAN solution appliances 205(1)-205(n), referred to generally as WAN solution appliance(s) 205. WAN solution appliance can include, for example, a WAN virtualized solution or a WAN optimizer. For example, WAN solution appliance 205 can accelerate, cache, compress, manage or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 can be a performance enhancing proxy or a WAN solution or optimization controller. In one embodiment, appliance 205 can be implemented as CloudBridge® products sold by Citrix Systems, Inc. of Fort Lauderdale, Fla.

Figure 1B:
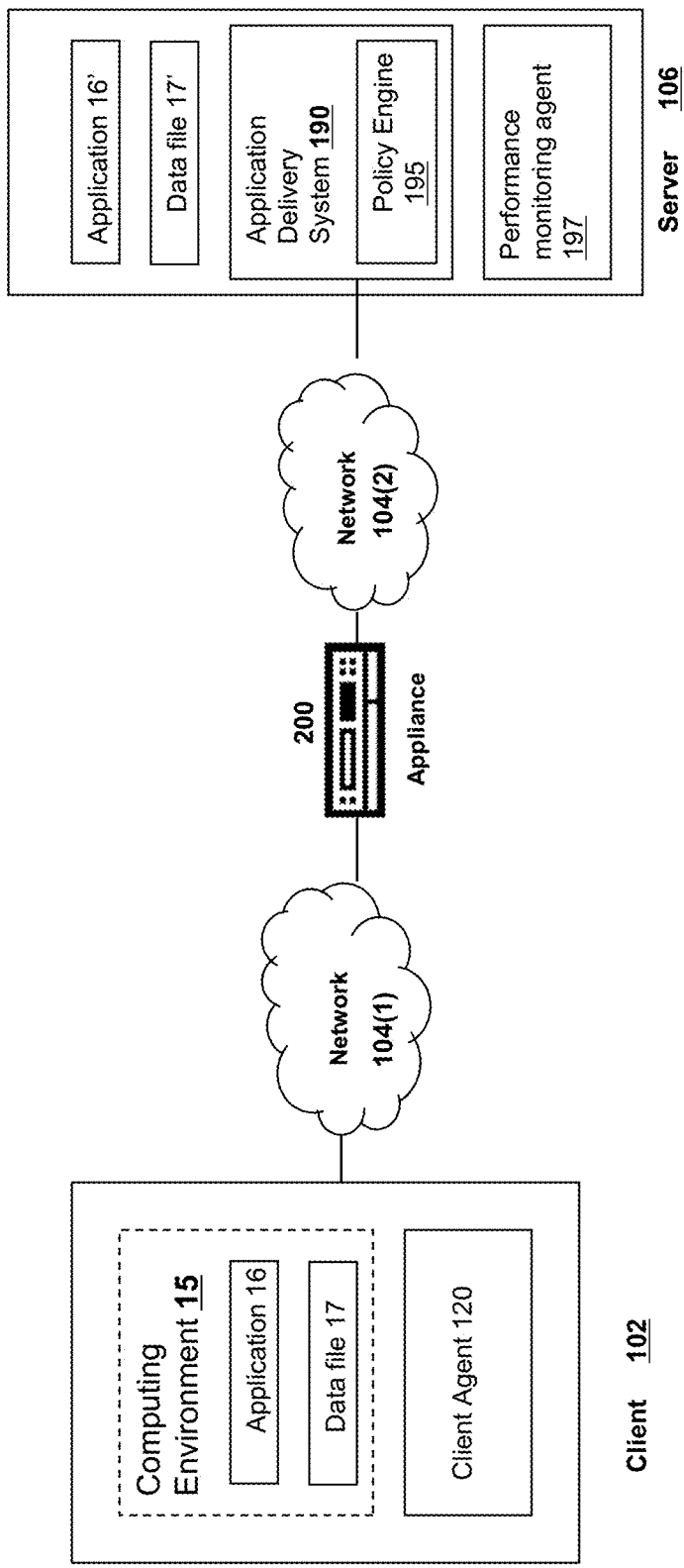
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 can include an application delivery system 190 for delivering a computing environment, application, and/or data files to one or more clients 102. Client 102 can include client agent 120 and computing environment 15. Computing environment 15 can execute or operate an application 16 that accesses, processes or uses a data file 17. Computing environment 15, application 16 and/or data file 17 can be delivered via appliance 200 and/or the server 106.

Appliance 200 can accelerate delivery of all or a portion of computing environment 15 to a client 102, for example by the application delivery system 190. For example, appliance 200 can accelerate delivery of a streaming application and data file processable by the application from a data center to a remote user location by accelerating transport layer traffic between a client 102 and a server 106. Such acceleration can be provided by one or more techniques, such as: 1) transport layer connection pooling, 2) transport layer connection multiplexing, 3) transport control protocol buffering, 4) compression, 5) caching, or other techniques. Appliance 200 can also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 can deliver computing environment 15 to a user (e.g., client 102), remote or otherwise, based on authentication and authorization policies applied by policy engine 195. A remote user can obtain a computing environment and access to server stored applications and data files from any network-connected device (e.g., client 102). For example, appliance 200 can request an application and data file from server 106. In response to the request, application delivery system 190 and/or server 106 can deliver the application and data file to client 102, for example via an application stream to operate in computing environment 15 on client 102, or via a remote-display protocol or otherwise via remote-based or server-based computing. In an embodiment, application delivery system 190 can be implemented as any portion of the Citrix Workspace Suite™ by Citrix Systems, Inc., such as XenApp® or XenDesktop®.

Policy engine 195 can control and manage the access to, and execution and delivery of, applications. For example, policy engine 195 can determine the one or more applications a user or client 102 can access and/or how the application should be delivered to the user or client 102, such as a server-based computing, streaming or delivering the application locally to the client 120 for local execution.

For example, in operation, a client 102 can request execution of an application (e.g., application 16') and application delivery system 190 of server 106 determines how to execute application 16', for example based upon credentials received from client 102 and a user policy applied by policy engine 195 associated with the credentials. For example, application delivery system 190 can enable client 102 to receive application-output data generated by execution of the application on a server 106, can enable client 102 to execute the application locally after receiving the application from server 106, or can stream the application via network 104 to client 102. For example, in some embodiments, the application can be a server-based or a remote-based application executed on server 106 on behalf of client 102. Server 106 can display output to client 102 using a thin-client or remote-display protocol, such as the Independent Computing Architecture (ICA) protocol by Citrix Systems, Inc. of Fort Lauderdale, Fla. The application can be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 can include a performance monitoring service or agent 197. In some embodiments, a dedicated one or more servers 106 can be employed to perform performance monitoring. Performance monitoring can be performed using data collection, aggregation, analysis, management and reporting, for example by software, hardware or a combination thereof. Performance monitoring can include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents can monitor, measure, collect, and/or analyze data on a predetermined frequency, based upon an occurrence of given event(s), or in real time during operation of network environment 100. The monitoring agents can monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics can be monitored.

The monitoring agents can provide application performance management for application delivery system 190. For example, based upon one or more monitored performance conditions or metrics, application delivery system 190 can be dynamically adjusted, for example periodically or in real-time, to optimize application delivery by servers 106 to clients 102 based upon network environment performance and conditions.

In described embodiments, clients 102, servers 106, and appliances 200 and 205 can be deployed as and/or executed on any type and form of computing device, such as any desktop computer, laptop computer, or mobile device capable of communication over at least one network and performing the operations described herein. For example, clients 102, servers 106 and/or appliances 200 and 205 can each correspond to one computer, a plurality of computers, or a network of distributed computers such as computer 101 shown in FIG. 1C.

Figure 1C:
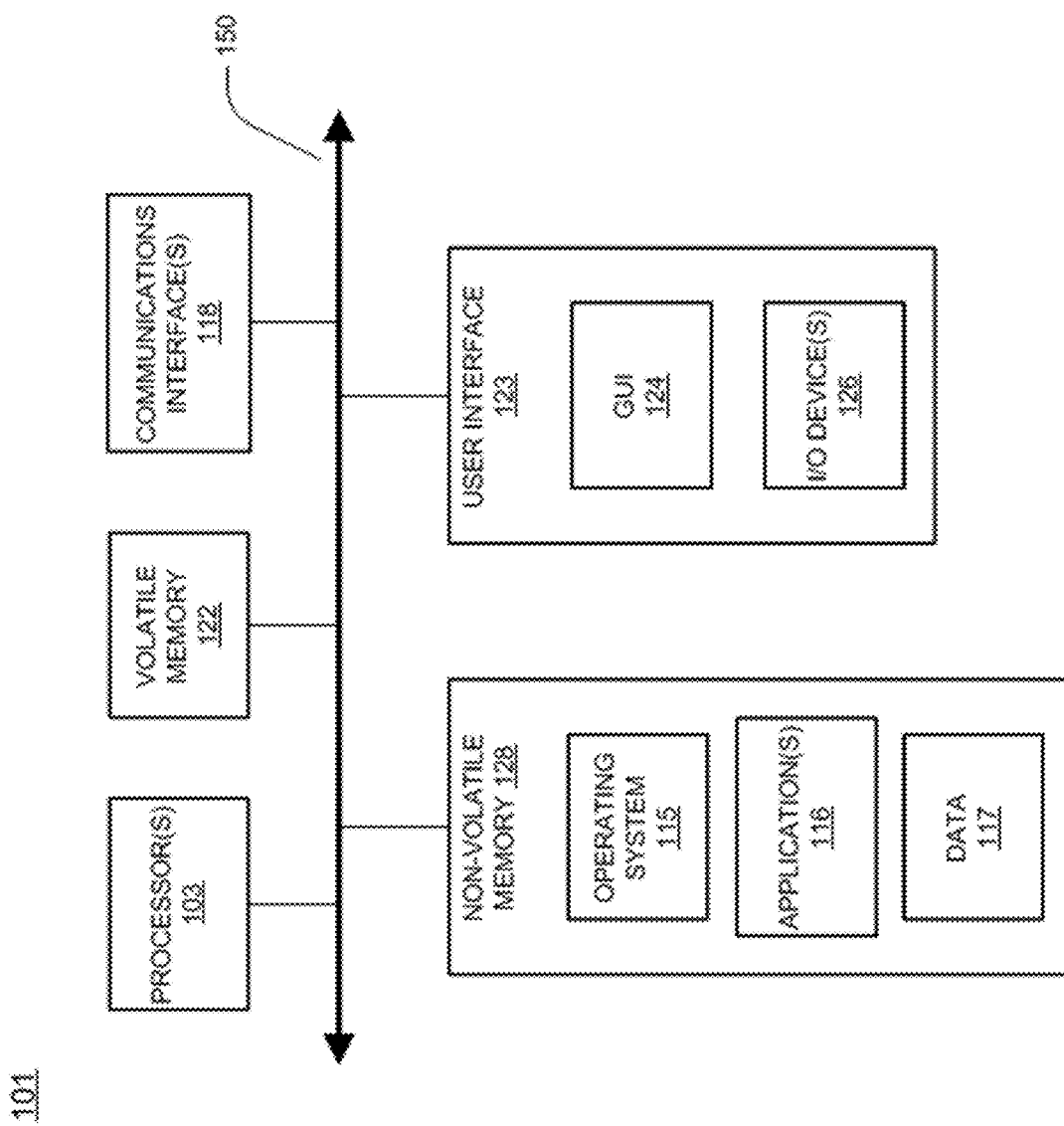
FIG. 1C is a block diagram of a computing device, in accordance with an illustrative embodiment.

As shown in FIG. 1C, computer 101 can include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 can include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data can be entered using an input device of GUI 124 or received from I/O device(s) 126. Various elements of computer 101 can communicate via communication bus 150. Computer 101 as shown in FIG. 1C is shown merely as an example, as clients 102, servers 106 and/or appliances 200 and 205 can be implemented by any computing or processing environment and with any type of machine or set of machines that can have suitable hardware and/or software capable of operating as described herein.

Processor(s) 103 can be implemented by one or more programmable processors executing one or more computer programs to perform the functions of the system. As used herein, the term "processor" describes an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" can be analog, digital or mixed-signal. In some embodiments, the "processor" can be one or more physical processors or one or more "virtual" (e.g., remotely located or "cloud") processors.

Communications interfaces 118 can include one or more interfaces to enable computer 101 to access a computer network such as a LAN, a WAN, or the Internet through a variety of wired and/or wireless or cellular connections.

In described embodiments, a first computing device 101 can execute an application on behalf of a user of a client computing device (e.g., a client 102), can execute a virtual machine, which provides an execution session within which applications execute on behalf of a user or a client computing device (e.g., a client 102), such as a hosted desktop session, can execute a terminal services session to provide a hosted desktop environment, or can provide access to a computing environment including one or more of: one or more applications, one or more desktop applications, and one or more desktop sessions in which one or more applications can execute.

Additional details of the implementation and operation of network environment 100, clients 102, servers 106, and appliances 200 and 205 can be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
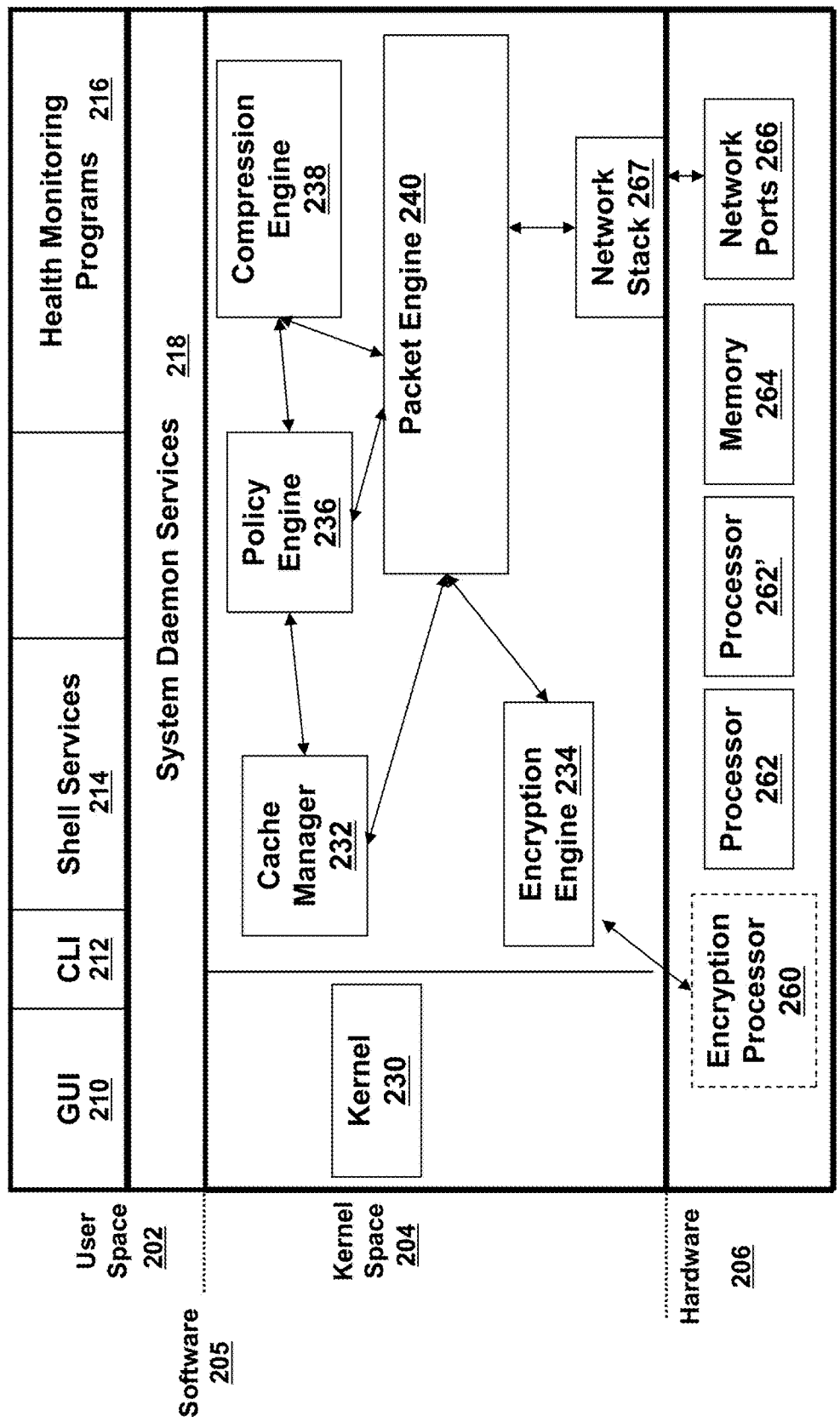
FIG. 2 is a block diagram of an appliance for processing communications between a client and a server, in accordance with an illustrative embodiment.

FIG. 2 shows an example embodiment of appliance 200. As described herein, appliance 200 can be implemented as a server, gateway, router, switch, bridge or other type of computing or network device. As shown in FIG. 2, an embodiment of appliance 200 can include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 can include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 can also include a number of network services or processes working in conjunction with cache manager 232.

Appliance 200 can include one or more network stacks 267, such as a TCP/IP based stack, for communicating with client(s) 102, server(s) 106, network(s) 104, and/or other appliances 200 or 205. For example, appliance 200 can establish and/or terminate one or more transport layer connections between clients 102 and servers 106. Each network stack 267 can include a buffer 243 for queuing one or more network packets for transmission by appliance 200.

Kernel space 204 can include cache manager 232, packet engine 240, encryption engine 234, policy engine 236 and compression engine 238. In other words, one or more of processes 232, 240, 234, 236 and 238 run in the core address space of the operating system of appliance 200, which can reduce the number of data transactions to and from the memory and/or context switches between kernel mode and user mode, for example since data obtained in kernel mode may not need to be passed or copied to a user process, thread or user level data structure.

Cache manager 232 can duplicate original data stored elsewhere or data previously computed, generated or transmitted to reducing the access time of the data. In some embodiments, the cache memory can be a data object in memory 264 of appliance 200, or can be a physical memory having a faster access time than memory 264.

Policy engine 236 can include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 can process any security related protocol, such as SSL or TLS. For example, encryption engine 234 can encrypt and decrypt network packets, or any portion thereof, communicated via appliance 200, can setup or establish SSL, TLS or other secure connections, for example between client 102, server 106, and/or other appliances 200 or 205. In some embodiments, encryption engine 234 can use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 can manage kernel-level processing of packets received and transmitted by appliance 200 via network stacks 267 to send and receive network packets via network ports 266. Packet engine 240 can operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 can include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 can interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 can determine if a program, process, service or task is active and currently running, check status, error or history logs provided by any program, process, service or task to determine any condition, status or error with any portion of appliance 200. Additionally, health monitor 216 can measure and monitor the performance of any application, program, process, service, task or thread executing on appliance 200.

Daemon services 218 are programs that run continuously or in the background and handle periodic service requests received by appliance 200. In some embodiments, a daemon service can forward the requests to other programs or processes, such as another daemon service 218 as appropriate.

As described herein, appliance 200 can relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 can translate or multiplex communications by modifying sequence numbers and acknowledgment numbers at the transport layer protocol level (e.g., "connection multiplexing"). Appliance 200 can also provide switching or load balancing for communications between the client 102 and server 106.

As described herein, each client 102 can include client agent 120 for establishing and exchanging communications with appliance 200 and/or server 106 via a network 104. Client 102 can have installed and/or execute one or more applications that are in communication with network 104. Client agent 120 can intercept network communications from a network stack used by the one or more applications. For example, client agent 120 can intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 can transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 can perform acceleration, streaming, monitoring, and/or other operations. For example, client agent 120 can accelerate streaming an application from a server 106 to a client 102. Client agent 120 can also perform end-point detection/scanning and collect end-point information about client 102 for appliance 200 and/or server 106. Appliance 200 and/or server 106 can use the collected information to determine and provide access, authentication and authorization control of the client's connection to network 104. For example, client agent 120 can identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 can be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 can include allocated virtual resources such as virtual processors 332 and/or virtual disks 342, as well as virtual resources such as virtual memory and virtual network interfaces. In some embodiments, at least one of VMs 306 can include a control operating system (e.g., 305) in communication with hypervisor 301 and used to execute applications for managing and configuring other VMs (e.g., guest operating systems 310) on device 302.

In general, hypervisor(s) 301 can provide virtual resources to an operating system of VMs 306 in any manner that simulates the operating system having access to a physical device. Thus, hypervisor(s) 301 can be used to emulate virtual hardware, partition physical hardware, virtualize physical hardware, and execute virtual machines that provide access to computing environments. In an illustrative embodiment, hypervisor(s) 301 can be implemented as a XEN hypervisor, for example as provided by the open source Xen.org community. In an illustrative embodiment, device 302 executing a hypervisor that creates a virtual machine platform on which guest operating systems can execute is referred to as a host server. In such an embodiment, device 302 can be implemented as a XEN server as provided by Citrix Systems, Inc., of Fort Lauderdale, Fla.

Hypervisor 301 can create one or more VMs 306 in which an operating system (e.g., control operating system 305 and/or guest operating system 310) executes. For example, the hypervisor 301 loads a virtual machine image to create VMs 306 to execute an operating system. Hypervisor 301 can present VMs 306 with an abstraction of hardware layer 307, and/or can control how physical capabilities of hardware layer 307 are presented to VMs 306. For example, hypervisor(s) 301 can manage a pool of resources distributed across multiple physical computing devices.

In some embodiments, one of VMs 306 (e.g., the VM executing control operating system 305) can manage and configure other of VMs 306, for example by managing the execution and/or termination of a VM and/or managing allocation of virtual resources to a VM. In various embodiments, VMs can communicate with hypervisor(s) 301 and/or other VMs via, for example, one or more Application Programming Interfaces (APIs), shared memory, and/or other techniques.

In general, VMs 306 can provide a user of device 302 with access to resources within virtualized computing environment 300, for example, one or more programs, applications, documents, files, desktop and/or computing environments, or other resources. In some embodiments, VMs 306 can be implemented as fully virtualized VMs that are not aware that they are virtual machines (e.g., a Hardware Virtual Machine or HVM). In other embodiments, the VM can be aware that it is a virtual machine, and/or the VM can be implemented as a paravirtualized (PV) VM.

Figure 3:
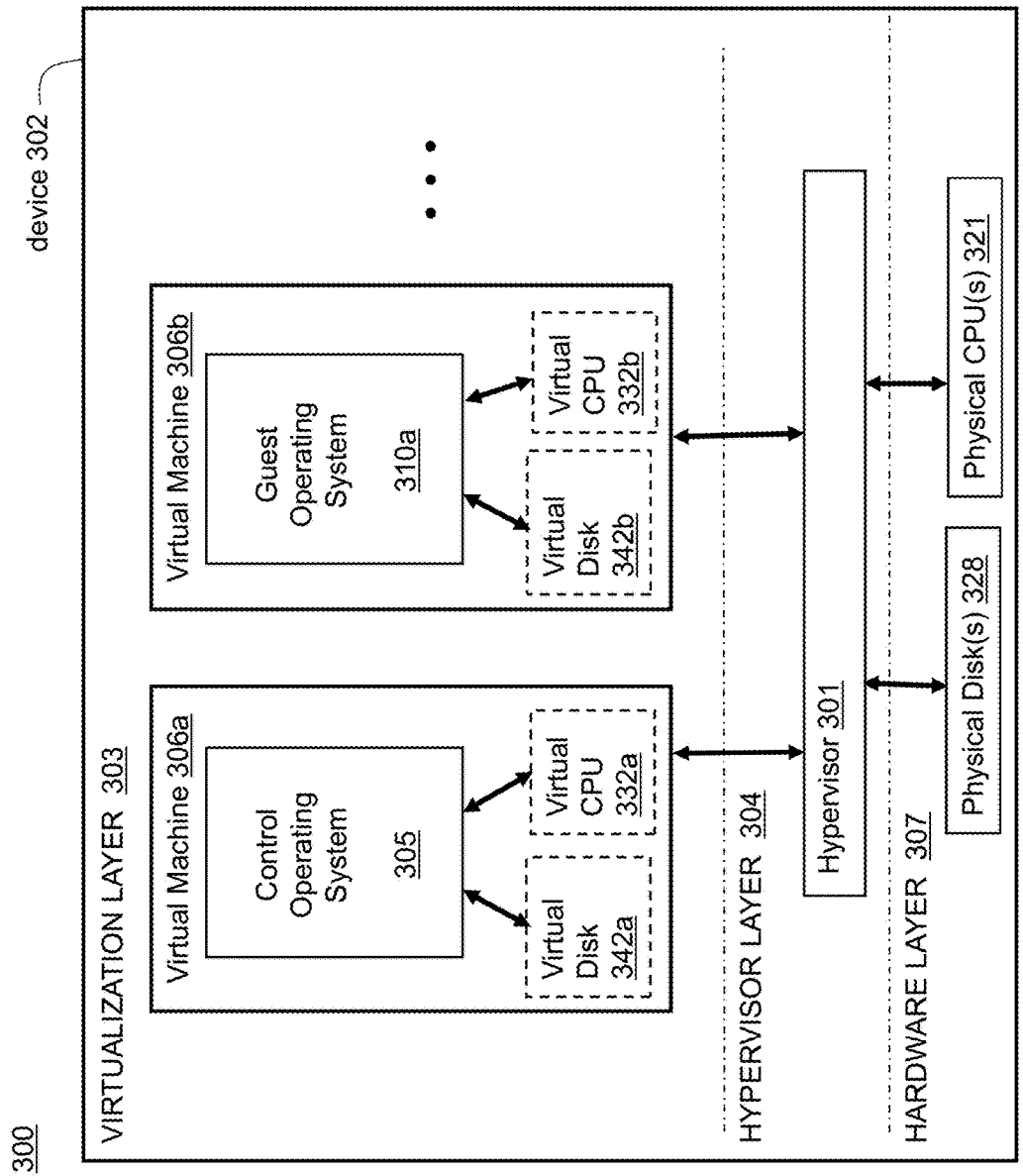
FIG. 3 is a block diagram of a virtualization environment, in accordance with an illustrative embodiment.

Although shown in FIG. 3 as including a single virtualized device 302, virtualized environment 300 can include a plurality of networked devices in a system in which at least one physical host executes a virtual machine. A device on which a VM executes can be referred to as a physical host and/or a host machine. For example, appliance 200 can be additionally or alternatively implemented in a virtualized environment 300 on any computing device, such as a client 102, server 106 or appliance 200. Virtual appliances can provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 can be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server can execute multiple virtual machines 306, for example on various cores of a multi-core processing system and/or various processors of a multiple processor device. For example, although generally shown herein as "processors" (e.g., in FIGS. 1C, 2 and 3), one or more of the processors can be implemented as either single- or multi-core processors to provide a multi-threaded, parallel architecture and/or multi-core architecture. Each processor and/or core can have or use memory that is allocated or assigned for private or local use that is only accessible by that processor/core, and/or can have or use memory that is public or shared and accessible by multiple processors/cores. Such architectures can allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality can be implemented in a virtualized environment (e.g., 300) on a client 102, server 106 or appliance 200, such that the functionality can be implemented across multiple devices, such as a cluster of computing devices, a server farm or network of computing devices, etc. The various processors/cores can interface or communicate with each other using a variety of interface techniques, such as core to core messaging, shared memory, kernel APIs, etc.

In embodiments employing multiple processors and/or multiple processor cores, described embodiments can distribute data packets among cores or processors, for example to balance the flows across the cores. For example, packet distribution can be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets can be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS can use a hashing scheme to determine a core or processor for processing a packet.

The RSS can generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof can be used to identify a processor, core, engine, etc., for distributing a network packet, for example via a hash table, indirection table, or other mapping technique.

Additional details of the implementation and operation of a multi-processor and/or multi-core system can be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
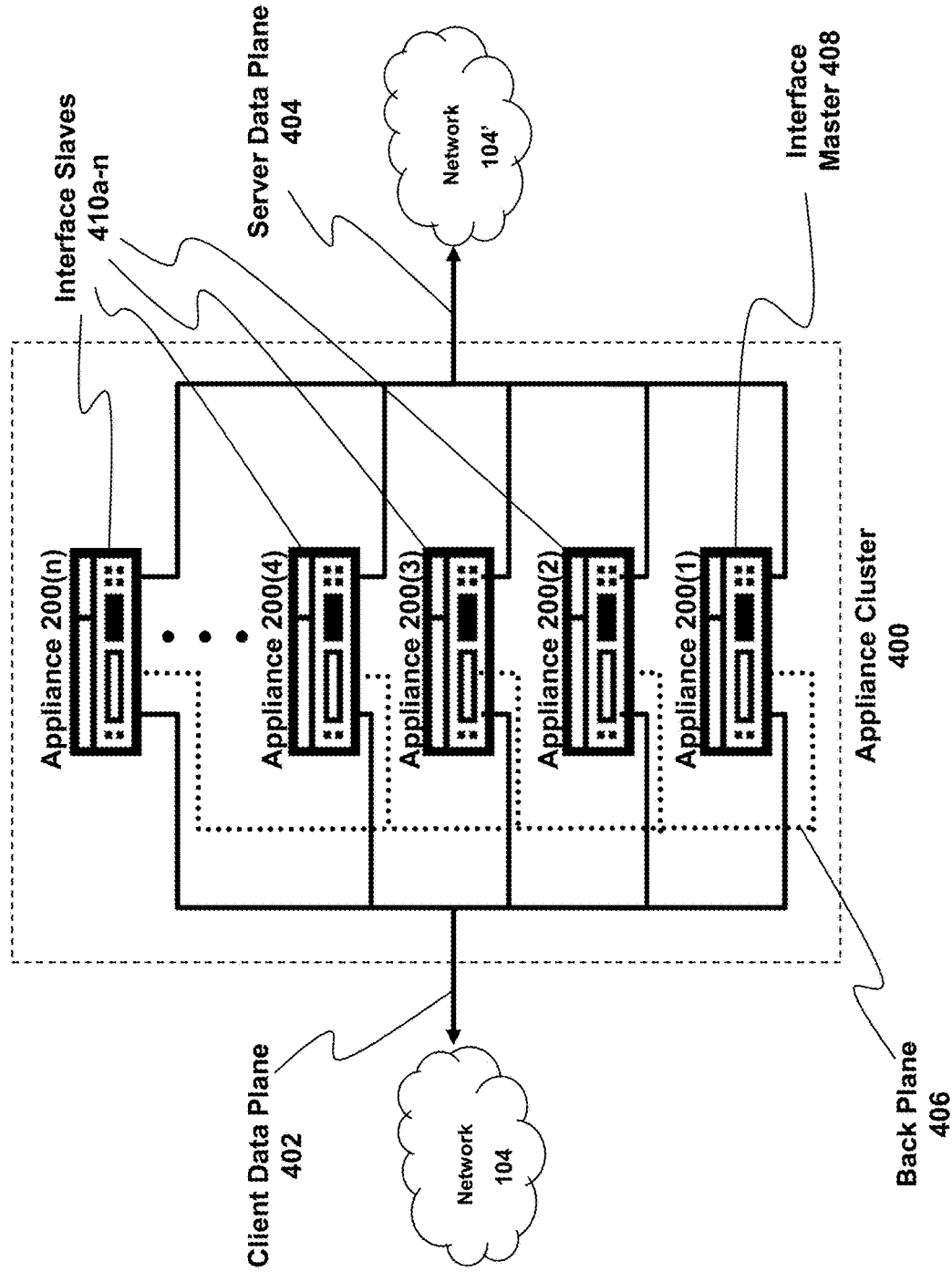
FIG. 4 is a block diagram of a cluster system, in accordance with an illustrative embodiment.

Although shown in FIGS. 1A and 1B as being single appliances, appliances 200 can be implemented as one or more distributed or clustered appliances. Individual computing devices or appliances can be referred to as nodes of the cluster. A centralized management system can perform load balancing, distribution, configuration, or other tasks to allow the nodes to operate in conjunction as a single computing system. Such a cluster can be viewed as a single virtual appliance or computing device. FIG. 4 shows a block diagram of an illustrative computing device cluster or appliance cluster 400. A plurality of appliances 200 or other computing devices (e.g., nodes) can be joined into a single cluster 400. Cluster 400 can operate as an application server, network storage server, backup service, or any other type of computing device to perform many of the functions of appliances 200 and/or 205.

In some embodiments, each appliance 200 of cluster 400 can be implemented as a multi-processor and/or multi-core appliance, as described herein. Such embodiments can employ a two-tier distribution system, with one appliance if the cluster distributing packets to nodes of the cluster, and each node distributing packets for processing to processors/cores of the node. In many embodiments, one or more of appliances 200 of cluster 400 can be physically grouped or geographically proximate to one another, such as a group of blade servers or rack mount devices in a given chassis, rack, and/or data center. In some embodiments, one or more of appliances 200 of cluster 400 can be geographically distributed, with appliances 200 not physically or geographically co-located. In such embodiments, geographically remote appliances can be joined by a dedicated network connection and/or VPN. In geographically distributed embodiments, load balancing can also account for communications latency between geographically remote appliances.

In some embodiments, cluster 400 can be considered a virtual appliance, grouped via common configuration, management, and purpose, rather than as a physical group. For example, an appliance cluster can comprise a plurality of virtual machines or processes executed by one or more servers.

As shown in FIG. 4, appliance cluster 400 can be coupled to a first network 104(1) via client data plane 402, for example to transfer data between clients 102 and appliance cluster 400. Client data plane 402 can be implemented a switch, hub, router, or other similar network device internal or external to cluster 400 to distribute traffic across the nodes of cluster 400. For example, traffic distribution can be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 can be coupled to a second network 104(2) via server data plane 404. Similarly to client data plane 402, server data plane 404 can be implemented as a switch, hub, router, or other network device that can be internal or external to cluster 400. In some embodiments, client data plane 402 and server data plane 404 can be merged or combined into a single device.

In some embodiments, each appliance 200 of cluster 400 can be connected via an internal communication network or backplane 406. Backplane 406 can enable inter-node or inter-appliance control and configuration messages, for inter-node forwarding of traffic, and/or for communicating configuration and control traffic from an administrator or user to cluster 400. In some embodiments, backplane 406 can be a physical network, a VPN or tunnel, or a combination thereof.

Additional details of cluster 400 can be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Tunneling Packets

The present disclosure is directed to systems and methods for tunneling packets between intermediary devices to be transmitted across different paths. In a networking environment, networking devices, such as devices intermediary to a client and a server, can provide a wide area network or a software-defined wide area network ("SD-WAN"). An SD-WAN can provide a layer of abstraction from the underlying wide area network ("WAN") links in the network service provider's network by encapsulating network traffic in an overlay tunnel (or virtual path).

The overlay can use virtual internet protocol addresses ("VIPs") or tunnel end-points configured on each SD-WAN device (e.g., branch appliances or master control node ("MCN")). The intermediary device can configured to provide an SD-WAN can insert a source and destination user datagram port ("UDP") set to a predetermined value (e.g., 4980). However, the disadvantage of setting the UDP to a predetermined value is that all traffic coming in from a LAN and flowing between a pair of networking sites is assigned the same packet header information (e.g., 6 tuple information), and hence the intermediate devices perform the same load balancing. This can lead to polarization of a customer's traffic on a particular path, hence leading to overutilization of certain links.

Thus, systems and methods of the present disclosure allow intermediary devices to capture the traffic entropy in the source port. The intermediary devices can capture LAN traffic flow information in the overlay headers so as to provide efficient load balancing over WAN and reduce, mitigate, or eliminate polarization of flows between sites. The intermediary devices can also capture LAN traffic flow information in the overlay headers in order to policy-based route it to a security zone for "cleaning" traffic or for compliance reasons. The intermediary devices can capture flow information, such as information in the IP header (e.g., source port). For example, when the intermediary devices parse a 5 tuple to calculate the hash, because the source ports are different (everything else may be the same because the network traffic is tunneled), the hash would be different and cause the load balancer to direct the traffic via different paths or links. Capturing the flow information in the overlay headers can allow for improved load balancing as opposed to creating multiple tunnels with different IP headers, which increases overhead and resource utilization.

To improve the performance of load balancing on network traffic in a tunnel overlay, an intermediary device of the present disclosure can analyze the network traffic ingress from the LAN, such as a 6 tuple of a packet header of that can include: Source-IP, Destination-IP, Source-Port, Destination-Port, Protocol and DSCP). For each unique packet header, the intermediary device can inserting a virtual path overlay header and add a default destination port, but add a different Source Port. Thus, the intermediary device can capture the flow data of a Layer-3 payload in the Source Port of the encapsulated packet.

The intermediary devices in the network, such as a network comprising core routers or edge routers maintained by a carrier or network service provider, can now identify that the source port is different for the different 6 Tuple packet flows from a site, and assign the packets a different load balancing treatment. Thus, instead of all traffic between two sites being treated as a single packet flow by the intermediate devices, the intermediary devices can now identify different 6 tuples and load balance accordingly.

Further, if there are routing domains configured between sites, the intermediary device can include Routing domain context while ascertaining the Source Port. This provides an additional level of capturing flow information. The intermediary device can, therefore, provide both packet flow separation between two sites as well as provide flow separation at a per routing-domain level. This can allow for differentiated load balancing even when the same traffic flows on different routing domains between the same two sites.

Figure 5A:
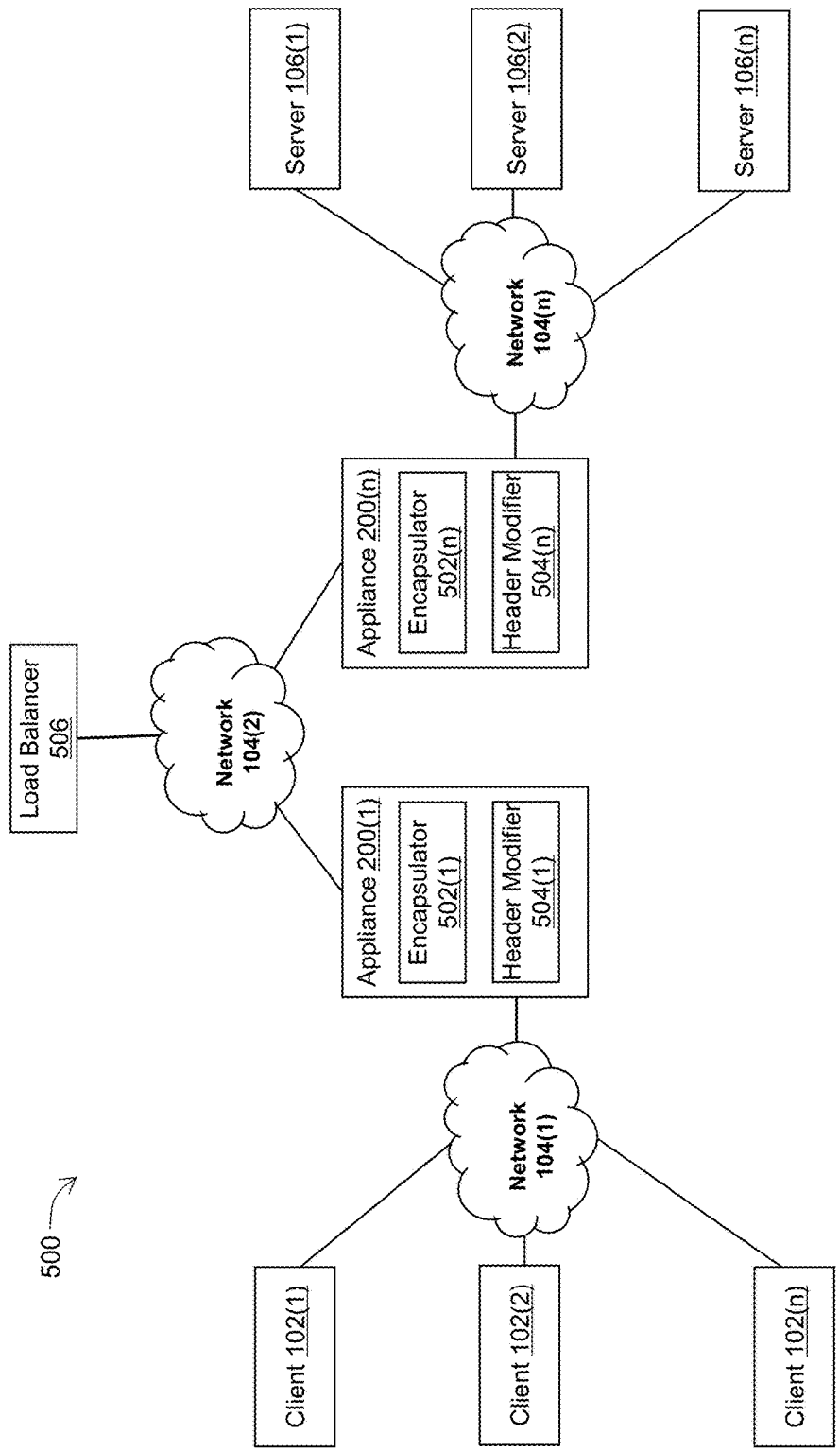
FIG. 5A is a block diagram of a system for tunneling packets, in accordance with an illustrative embodiment.

Referring now to FIG. 5A, depicted is a block diagram of an embodiment of a system 500 for predicting health of a link. In brief summary, the system 500 can include a plurality of client devices 102(1)-(n), one or more appliances 200(1)-n (e.g., a first appliance 200(1) and a second appliance 200(n) as shown), and a plurality of servers 106(1)-(n). The client-side facing appliances 200(1)-n (e.g., the first appliance 200(1)) can be communicatively connected to the one or more clients 102(1)-(n) via network 104. The server-side appliances 200(1)-n (e.g., the second appliance 200(n)) can be communicatively connected to the one or more servers 106(1)-(n) via network 104(n). The client-side facing appliances 200(1)-n (e.g., the first appliance 200(1)) and the server-side facing appliances 200(1)-n (e.g., the second appliance 200(n)) can be communicatively connected to one another via network 104(2). In some embodiments, there can be one or more communication links via the network 104(2) connecting the client-side facing appliances 200(1)-n (e.g., the first appliance 200(1)) and the server-side facing appliances 200(1)-n (e.g., the second appliance 200(n)). The networks 104 and 104(n) can be local area networks (LAN), whereas the network 104(2) can be a wide area network (WAN) for example.

Each appliance 200(1)-n can comprise features of any embodiment of the devices 200, described above in connection with at least FIGS. 1A-1C, 2, and 4. Each of the above-mentioned elements or entities is implemented in hardware, or a combination of hardware and software, in one or more embodiments. For instance, each of these elements or entities can include any application, program, library, script, task, service, process or any type and form of executable instructions executing on hardware of the device 200. The hardware includes circuitry such as one or more processors in one or more embodiments.

The systems and methods of the present solution can be implemented in any type and form of device, including clients, servers and appliances 200. As referenced herein, a "server" can sometimes refer to any device in a client-server relationship, e.g., an appliance 200 in a handshake with a client device 102(1)-(n). The present systems and methods can be implemented in any intermediary device or gateway, such as any embodiments of the appliance or devices 200 described herein. Some portion of the present systems and methods can be implemented as part of a packet processing engine and/or virtual server of an appliance, for instance. The systems and methods can be implemented in any type and form of environment, including multi-core appliances, virtualized environments and/or clustered environments described herein.

The first appliance 200(1) can include an encapsulator 502(1) and a header modifier 504(1). The second appliance 200(n) also can include an encapsulator 502(n) and a header modifier 504(n). The encapsulator 502(1) of the first appliance 200(1) can include similar functionalities as the encapsulator 502(n) of the second appliance 200(n). The header modifier 504(1) of the first appliance 200(1) can include similar functionalities as the header modifier 504(1) of the second appliance 200(n). Each of the first appliance 200(1) and the second appliance 200(n) can include or execute one or more virtual servers (e.g., virtual machine 306a or 306b). The virtual server can execute the encapsulator 502(1). The virtual server can execute the header modifier 504(1). Each of the first appliance 200(1) and the second appliance 200(n) can include or execute one or more packet engines (e.g., packet engine 240). The packet engine can execute the encapsulator 502(1). The packet engine can execute the header modifier 504(1).

Each of the one or more appliances 200(1)-n can include one or more of at least one virtual server, packet engine, encapsulator 502(1) and header Modifier 504(1), with similar functionalities as the first appliance 200(1) and the second appliance 200(n). The first appliance 200(1) can be referred to as a first device or a first intermediary device. The second appliance 200(n) can be referred to as a second device or a second intermediary device.

The first and second intermediary devices (e.g., appliance 200(1) or appliance 200(n)) can be in communication with one or more links traversing network 104(2). The links can be formed of one or more paths through network 104(2). For example, network 104(2) can include a wide area network (WAN). A WAN can include a telecommunications network or computer network that extends over a geographical distance. The WAN can transmit data over relatively long distances, and between different local area networks, personal area networks, or metropolitan area networks, for example. In some cases, the WAN can be configured as a public network or a private network, such as for a particular organization.

The one or more links for transferring or processing between the one or more clients 102(1)-(n) and the one or more servers 106(1)-(n) can be through two or more appliances 200(1)-n. In some embodiments, the one or more links for transferring or processing between the one or more clients 102(1)-(n) and the one or more servers 106(1)-(n) can be through the network 104(2) connecting the two or more appliances 200(1)-n.

The number of connections can refer to the number of connections over the link in network 104(2). Types of connections can include, for example, multiprotocol label switching ("MPLS"), broadband, wireless, virtual private network tunnel, secure link, encrypted link, type of protocol, frame size, etc.

The first intermediary device (e.g., appliance 200(1)) and the second intermediary device (e.g., appliance 200(n)b) can establish a tunnel. For example, the encapsulator 502(1) and encapsulator 502(n) can establish the tunnel. The tunnel can be between the first intermediary device and the second intermediary device. The tunnel can traverse one or more links of network 104(2). The links can be formed of one or more paths through network 104(2). The tunnel can encapsulate packets of transport layer connections between the one or more clients 102(1)-(n) and the one or more servers 106(1)-(n). The tunnel can encapsulate as payload the packets to hide aspects of the packets, provide increased security, or route the packets.

The tunnel can refer to a tunneling protocol that allows a network user to access or provide a network service that the underlying network does not support or provide directly. For example, a tunneling protocol can allow a foreign protocol to run over a network that does not support that particular protocol, such as running IPv6 over IPv4. In some cases, the tunneling protocol can provide increased network security, such as by providing a corporate network address to a remote user whose physical network address is not part of the corporate network. The encapsulator 502(1) can repackaging or encapsulate the network traffic data into a different form (e.g., with encryption), and hide the nature of the traffic that is run through the tunnels.

The encapsulator 502(1) can provide the tunnel by using the data portion of a packet (e.g., the payload) to carry the packets that actually provide the service. The encapsulator 502(1) can encapsulate the payload packets of transport layer connections. The transport layer connections can corresponding to a layered protocol model such as those of the Open Systems Interconnection ("OSI") or TCP/IP protocol suite. The transport layer connections can utilize one or more protocols such as User Datagram Protocol ("UDP"), UDP-Lite, transmission control protocol ("TCP"), Multipath TCP, Stream Control Transmission Protocol ("SCTP"), Datagram Congestion Control Protocol ("DCCP"), or Reliable Data Protocol ("RDP"), for example.

The encapsulators 502(1) and 502(n) can establish the tunnel using one or more tunneling protocols configured for the type of transport layer connection protocol. The encapsulators 502(1) and 502(n) can establish a Layer-3 tunnel and operate with layer 3 packets such as IP packets. The encapsulators 502(1) and 502(n) can establish the tunnel responsive to a request. The encapsulators 502(1) and 502(n) can establish the tunnel for a predetermined duration. The encapsulators 502(1) and 502(n) can establish the tunnel upon network setup by an administrator of the network. The encapsulators 502(1) and 502(n) can establish the tunnel responsive to a request from a client 102 or server 106. The encapsulators 502(1) and 502(n) can establish the tunnel between one or more endpoints or remote machines.

The appliance 200(1) can receive a first packet of a transport layer connection between a client 102(1) and a server 106(1). The appliance 200(1) can receive the first packet via network 104. In some cases, the appliance 200(n) can receive the first packet from server 106(1) via network 104(n), for example.

The header modifier 504(1) can parse the packet. The header modifier 504(1) can identify header fields of the first packet and the values of the fields. The header modifier 504(1) can identify the header fields based on an indication of the type of network protocol being used or the transport layer connection. The header modifier 504(1) can identify from the packet fields including, for example, a source IP address, a source port, a destination IP address, a destination port, a protocol and a differentiated services field. The fields can be part of the IP header of the packet. The source IP address can correspond to the IP address of the device sending the first packet. The source port can refer to an endpoint of the packet, such as the endpoint on the source device having the source IP address. The destination IP address can correspond to the IP address of the device to which the packet is destined. The destination port can refer to the destination endpoint for the packet. The protocol can refer to protocol being used (e.g., TCP, UDP, ICMP). The differential services field can refer to a Type of Service field in the IP header, which can indicate the quality of service desired for the datagram and can be based on factors such as precedence, speed, throughput and reliability.

To facilitate load balancing the packet across the plurality of paths of network 104(2) to the second intermediary device appliance 200(n), the header modifier 504(1) can set values of a header of a second packet prior to transmitting the second packet to the appliance 200(n). The second packet that is to be transmitted to appliance 200(n) can include the payload of the first packet received by appliance 200(1), thereby encapsulating the first packet. The header modifier 504(1) can obtain a predetermined destination port value and populate the destination port field with the predetermined destination port. The predetermined destination port can be a default value, preset value, or a destination port of the appliance 200(n). For example, the predetermined destination port value can be 4980.

The header modifier 504(1) can determine a new source port for the second packet header. The header modifier 504(1) can be configured with a hash function to generate the new source port value. The hash function can receive as input an n-tuple, and output a value that can be used as the source port for the second header. For example, the header modifier 504(1) can use a 6-tuple formed from the following information from the first packet: source IP address indicated by first packet, the source port indicated by the first packet, the destination IP address indicated by the first packet, the destination port indicated by the first packet, the protocol indicated by the first packet and the differentiated services field indicated by the first packet. The protocol can be an internet protocol (IP) protocol.

The hash function can be used to generate the hash value to be populated in the source port field of the header of the second packet. The hash function can map input data of a first size to an output hash value having a second size that can be different from the size of the input data. The hash function can refer to a function that can be used to map input data to a hash value. The hash function can include or utilize a hash table to map input values to an output hash value. The header modifier 504(1) can use one or more types of hash functions, such as a checksum such as MD5, or a cryptographic hash function such as Secure Hash Algorithm 1 ("SHA-1").

In some cases, the header modifier 504(1) can further identify a routing domain of the first packet and include the routing domain as input to the hash function used to generate the hash value to be used as the source port of the second packet. The routing domain can identify a domain of an entity of a plurality of different entities having network traffic traversing between the first intermediary device and the second intermediary device. Entities can refer to providers of web sites, online services, online applications, servers, etc.

The header modifier 504(1) can provide the predetermined destination port value for the second packet and the source port value generated based on the hash function to the encapsulator 502(1). In some cases, the header modifier 504(1) can include the routing domain in the header of the second packet. The encapsulator 502(1) can generate a second packet that includes this source port value and destination port value in the header, as well as the first packet in the payload of the second packet. The second packet can be generated using a transport layer protocol, such as UDP. The appliance 200(1) can populate the header of the second packet with a source IP address of the appliance 200(1) and a destination IP address of the appliance 200(n) to which the second packet is destined. Upon populating the header of the second packet, the encapsulator 502(1) can transmit the second packet to appliance 200(n).

As the second packet is transmitted to appliance 200(n), the second packet can be load balanced across a plurality of paths to the appliance 200(n) based on at least a second hash of the header of the second packet. For example, a load balancer 506 can load balance the second packet based on at least the second hash of the header of the second packet. The load balancer 506 can execute or be a part of appliance 200(1) or another network device operating on network 104(2), such as a gateway or router.

The load balancer 506 can utilize a forwarding mechanism that distributes traffic over multiple links based on certain parameters. The load balancer 506 can utilize one or more load balancing techniques to identify or select a path of the plurality of paths of network 104(2). For example, the load balancer 506 can utilize an Equal-cost multi-path routing ("ECMP") load balancing technique where next-hop packet forwarding to a single destination can occur over multiple paths in network 104(2). ECMP can distribute packets across multiple links based on Layer 3 routing information. If the load balancer 506 (e.g., router or network device) discovers multiple paths to a destination, a routing table is updated with multiple entries for that destination. Per-flow load balancing allows the load balancer 506 to use multiple paths to achieve load sharing across multiple source-destination host pairs. Packets for a given source-destination host pair may take the same path, even if multiple paths are available. Traffic streams destined for different pairs tend to take different paths.

By generating the second packet with the header that includes a predetermined destination port and hash-generated source port, the load balancer 506 can select different paths for traffic streams that may previously have been destined for the same paths, thereby providing improved load balancing performance. For example, packets via different transport layers connections between the client and the server transmitted from the first intermediary device via the tunnel are transmitted via different paths of the plurality of paths to the second intermediary device.

The appliance 200(n) can receive the second packet via a first path of the plurality of paths selected by a load balancer 506 (e.g., network device connected to network 104(2)) performing load balancing based on at least the second hash of the second packet.

Figure 5B:
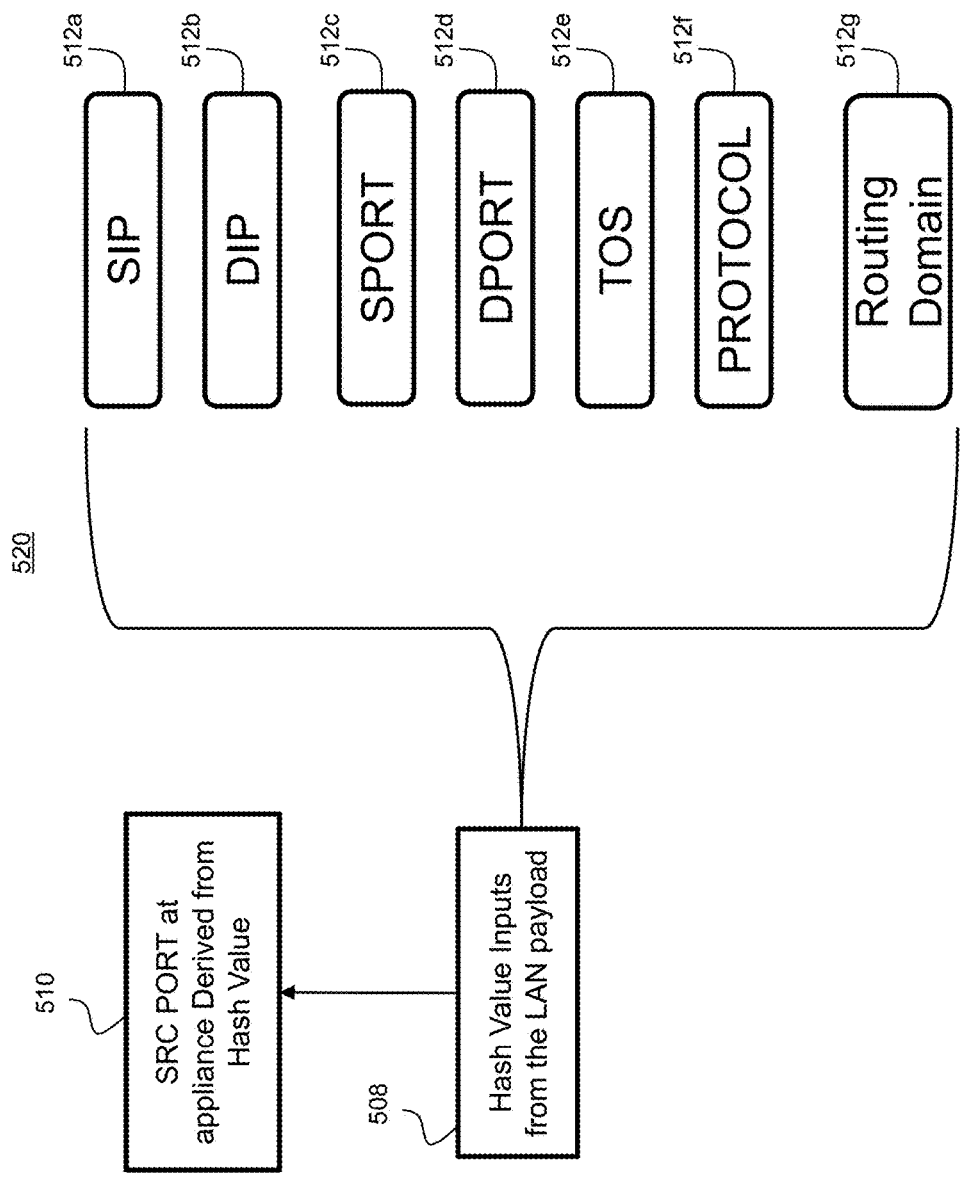
FIG. 5B is a block diagram of an example packet header, in accordance with an illustrative embodiment.

FIG. 5B is a block diagram of an example packet header, in accordance with an illustrative embodiment. The packet can refer to a first packet received by appliance 200(1) from a client over network 104 (e.g., a local area network "LAN"), as illustrated in FIG. 5A. As illustrated in FIG. 5B, the information obtained from the first packet can include Source IP address ("SIP") 512a, destination IP address ("DIP") 512b, source port ("SPORT") 512c, destination port ("DPORT") 512d, Type of Service ("TOS") 512e, a protocol (e.g., internet protocol (IP) protocol) 512f, and a routing domain 512g. The appliance 200(1) can identify the values of these fields and use them as hash value inputs at block 508. At block 510, the hash value can be used to populate the source port ("SRC PORT") of a second packet generated at the first intermediary device (e.g., appliance 200(1)) to be transmitted to a second intermediary device (e.g., appliance 200(n)).

Figure 5C:
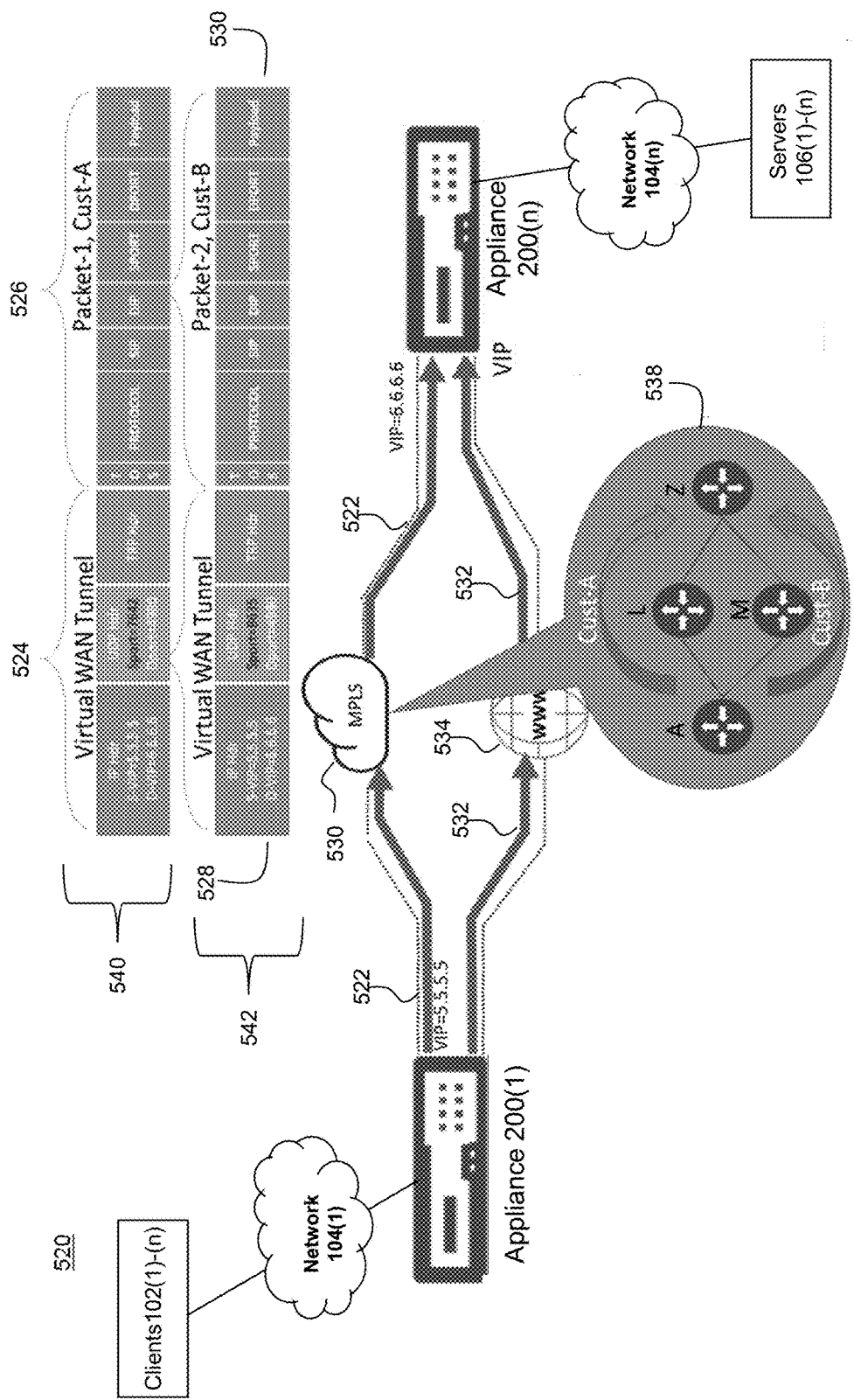
FIG. 5C is a block diagram of an operation of a system for tunneling packets, in accordance with an illustrative embodiment.

FIG. 5C is a block diagram of an operation of a system for tunneling packets, in accordance with an illustrative embodiment. The operation 520 can be performed by one or more component or system depicted in FIGS. 1-5A, including, e.g., appliance 200(1) and appliance 200(n). A tunnel 522 can be established between appliance 200(1) and appliance 200(n). The tunnel 522 can be formed of multiple paths. For example, the tunnel 522 can utilize multiprotocol label switching ("MPLS") links 530 to create virtual private networks (VPNs). MPLS links 530 can include or correspond to one or more function or aspect of network 104(2). The MPLS VPNs can include a layer 2 (VPLS) connection or layer 3 (VPRN) connection. The tunnel 522 can include a virtual WAN tunnel. The tunnel 522 can be an overlay on network 534 and path 532.

The appliance 200(1) can receive first packets 524 from clients 102(1)-(n). The appliance 200(1) can receive first packets 524, such as Packet-1 from a Customer A and Packet-2 from Customer B, for example.

The first packet 524 can include information associated with the local area network from which the first packet was sourced. The first packet fields 526 can include header information such as a TOS field, protocol field, SIP field, DIP field, SPORT field, DPORT field and a payload. The appliance 200(1) can identify the values of the fields 526 of the first packet as illustrated in Table 1 below.

Since the appliance 200(1) generates a second packet with the Virtual WAN Tunnel information as illustrated in Table 2. TRP hdr can refer to a tunneling report protocol header.

TABLE 2

Illustrative Example of header of second packets 540 and 542.

|  | IP Hdr: S-VIP | IP Hdr: D-VIP | UDP Hdr: SPORT | UDP Hdr: DPORT | TRP Hdr |
|---|---|---|---|---|---|
| Packet 540 | 5.5.5.5 | 6.6.6.6 | 7642 | 4980 |  |
| Packet 542 | 5.5.5.5 | 6.6.6.6 | 8635 | 4980 |  |

As illustrated in Table 2, the appliance 200(1) can populate the S-VIP field with the VIP value of the appliance 200(1) (e.g., 5.5.5.5), and populate the D-VIP field with the VIP value of the appliance 200(n) (e.g., 6.6.6.6). The appliance 200(1) can populate the SPORT using the generated hash value based on a tuple of values of the first packet illustrated in Table 1. The appliance 200(1) can populate then DPORT field with a predetermined destination port, such as 4980.

The appliance 200(1) can transmit second packets 540 and 542 to appliance 200(n). The packets 540 and 542 can be routed along different paths because a load balancer may select different paths for the packets based on their different SPORT values. For example, since the source port values are different in the encapsulated tunnel packets 540 and 542, the hash value generated by a load balancer that is load balancing the packets 540 and 542 may be different, thereby causing the load balancer to select different paths. Thus, the packet from customer A (e.g., encapsulated packet 540) can

TABLE 1

Illustrative Example of Information of Packets 1 and 2

|  | TOS | Protocol | SIP | DIP | SPORT | DPORT | Payload | Routing Domain |
|---|---|---|---|---|---|---|---|---|
| Packet-1 | 60 | IP | 1.1.1.1 | 2.2.2.2 | 1005 | 23 | xyz | Cust-A |
| Packet-2 | 50 | IP | 3.3.3.3 | 4.4.4.4 | 4556 | 20 | abc | Cust-B |

The appliance 200(1) can generate a second packet that with a header having a predetermined destination port (e.g., 4980) and a source port generated based on the values of one or more fields 526 of the first packet 526 (e.g., a hash of a tuple of the values of the fields 526 of the first packet). The appliance 200(1) can generate a second packet 540 that includes the virtual WAN tunnel header information 524, with the predetermined destination port and generated source port, as well as the first packet 526.

The appliance 200(1) can generate a second packet for each first packet received. For example, the appliance 200(1) can generate a second packet for Packet-1 received from Customer A ("Cust-A"), and a second packet for Packet-2 received from Customer B ("Cust-B").

The appliance 200(1) can transmit the second packet 540 to appliance 200(n). A load balancer or other networking device of MPLS 530 can select a path of the plurality of paths 538 of the MPLS 530 to perform load balancing. For example, a load balancer can be configured with an ECMP load balancing technique configured to transmit the second packet from node A to node Z via node L or node M, where a first path can include routing the packet from node A to node L to node Z, and a second path can include routing the packet from node A to node M to node Z.

be routed via nodes A-L-Z; and the packet from customer B (e.g., encapsulated packet 542) can be routed via nodes A-M-Z.

Figure 5D:
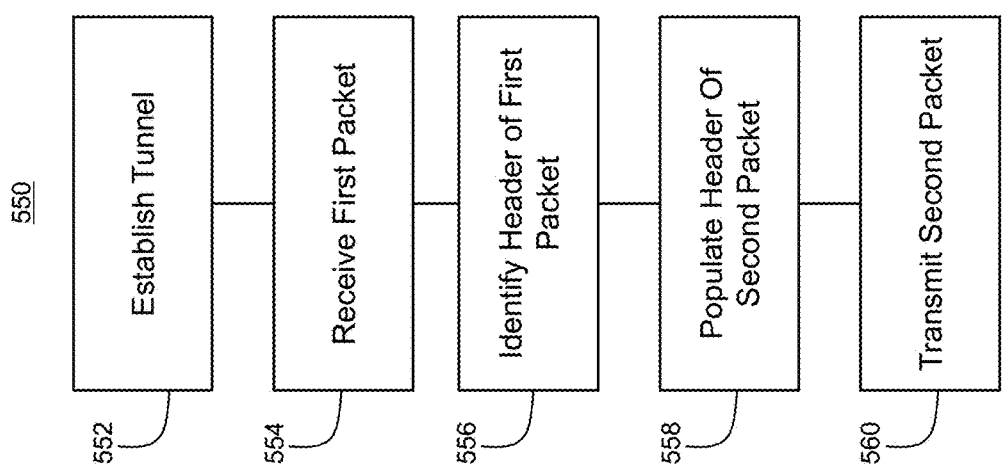
FIG. 5D is a flow diagram of method of tunneling packets, in accordance with an illustrative embodiment.

FIG. 5D is a flow diagram of method of tunneling packets, in accordance with an illustrative embodiment. The method 550 can be performed by one or more system or component depicted in FIGS. 1-5C, including, for example, appliance 200(1) and appliance 200(n). In brief overview, a tunnel is established at block 552. At block 554, a first packet is received. At block 556, a header of a first packet is identified. At block 558, the header of a second packet is populated. At block 560, a second packet is transmitted.

Still referring to FIG. 5D, and in some embodiments, a tunnel is established at block 552. The tunnel can include an overlay network or virtual private network. The tunnel can refer to encapsulating as payload packets to hide aspects of the packets, provide increased security, or route the packets. The tunnel can be established between intermediary devices. The intermediary devices can be intermediary to one or more clients and one or more servers. The intermediary devices can include an appliance or network device.

At block 554, a first intermediary device can receive a first packet. The first intermediary device can receive the first packet from a first client or first customer device. The first packet can be received over a transport layer connection. The first packet can include header information and payload information.

At block 556, the first intermediary device can identify header information of the first packet, such as a source internet protocol IP address, a source port, a destination IP address, a destination port, a protocol and a differentiated services field. The first intermediary can further identify a routing domain (e.g., Customer A or Customer B).

At block 558, the first intermediary device can generate a second packet with a second header. The first intermediary device can populate the header of the second packet. The second packet can encapsulate as payload the first packet received from the customer or client device. The first intermediary device can set the destination port of the second header to a predetermined destination port corresponding to an endpoint of the established tunnel (e.g., appliance 200(*n*)). The first intermediary device can set a source port of the second header to a value generated based on a hash of a tuple of values of the first packet received from the client or customer device. The tuple of values can include two or more of the source internet protocol IP address, the source port, the destination IP address, the destination port, the protocol, the differentiated services field, and the routing domain of the first packet.

At block 560, the first intermediary device can transmit the second packet to the second intermediary device. The second packet can include the second header generated, at least in part, by the first intermediary device. The payload of the second packet can include the first packet. Thus, the first intermediary device (or sender device) sends the tunneled packet over the tunnel with the tunnel header set with the source port=hash of tuple of first packet header, and destination port=predetermined value. The tunneled packet can encapsulate as payload the first packet.

The first intermediary device can transmit the second packet to be load balanced across a plurality of paths to the second intermediary device. The second packet can be load balanced based on a second hash of the header of the second packet, among other factors. The second packet can be load balanced at least in part based on the source port generated by the first intermediary device based on a hash of a tuple of values of the first packet, and the predetermined destination port.

Various elements, which are described herein in the context of one or more embodiments, can be provided separately or in any suitable subcombination. For example, the processes described herein can be implemented in hardware, or a combination of hardware and software. Further, the processes described herein are not limited to the specific embodiments described. For example, the processes described herein are not limited to the specific processing order described herein and, rather, process blocks can be re-ordered, combined, removed, or performed in parallel or in serial, or in response to another process block, as necessary, to achieve the results set forth herein.

It will be further understood that various changes in the details, materials, and arrangements of the parts that have been described and illustrated herein can be made by those skilled in the art without departing from the scope of the following claims.

I claim:

1. A method for tunneling packets between intermediary devices to be transmitted across different paths, comprising:
    (a) establishing a tunnel between a first intermediary device and a second intermediary device between one or more clients and one or more servers, the tunnel encapsulating as payload packets of transport layer connections between the one or more clients and the one or more servers;
    (b) receiving, by the first intermediary device, a first packet of a transport layer connection between a client of the one or more clients and a server of the one or more servers;
    (c) identifying, by the first intermediary device, from the first packet a source internet protocol (IP) address, a source port, a destination IP address, a destination port, a protocol and a differentiated services field;
    (d) populating, by the first intermediary device, a destination port of a header of a second packet to be transmitted via the tunnel with a predetermined destination port and a source port comprising a first hash of the source IP address, the source port, the destination IP address, the destination port, the protocol and the differentiated services field, the second packet comprising the first packet as a payload; and
    (e) transmitting, by the first intermediary device, the second packet to the second intermediary device, the second packet to be load balanced across a plurality of paths to the second intermediary device based on at least a second hash of the header of the second packet.

2. The method of claim 1, further comprising receiving, by the second intermediary device, the second packet via a first path of the plurality of paths selected by a network device performing load balancing based on at least the second hash of the second packet.

3. The method of claim 1, wherein (c) further comprises identifying a routing domain of the first packet.

4. The method of claim 2, wherein (d) further comprises including the routing domain as input to the first hash.

5. The method of claim 2, wherein (d) further comprises including the routing domain in the header of the second packet.

6. The method of claim 2, wherein the routing domain identifies a domain of an entity of a plurality of different entities having network traffic traversing between the first intermediary device and the second intermediary device.

7. The method of claim 1, wherein (d) further comprises populating the header of the second packet with a second source IP address of the first intermediary device and a second destination IP address of the second intermediary device.

8. The method of claim 1, wherein the header of the second packet comprises a unigram data protocol (UDP) header.

9. The method of claim 1, wherein the protocol comprises an internet protocol (IP) protocol.

10. The method of claim 1, wherein packets via different transport layers connections between the client and the server transmitted from the first intermediary device via the tunnel are transmitted via different paths of the plurality of paths to the second intermediary device.

11. A system for tunneling packets between intermediary devices to be transmitted across different paths, the system comprising:
    a first intermediary device configured to establish a tunnel with a second intermediary device that are configured to be intermediary to one or more clients and one or more servers, the tunnel encapsulating as payload packets of transport layer connections between the one or more clients and the one or more servers;
    wherein one of a virtual server or a packet engine executable on one or more processors, coupled to memory, of the first intermediary device is configured to:

receive a first packet of a transport layer connection between a client of the one or more clients and a server of the one or more servers;

identify from the first packet a source internet protocol (IP) address, a source port, a destination IP address, a destination port, a protocol and a differentiated services field;

populate a destination port of the header of a second packet to be transmitted via the tunnel with a predetermined destination port and a source port comprising a first hash of the source IP address, the source port, the destination IP address, the destination port, the protocol and the differentiated services field, the second packet comprising the first packet as a payload; and transmit the second packet to the second intermediary device, the second packet to be load balanced across a plurality of paths to the second intermediary device based on at least a second hash of the header of the second packet.

12. The system of claim 11, wherein the second intermediary device is further configured to receive the second packet via a first path of the plurality of paths selected by a network device performing load balancing based on at least the second hash of the second packet.

13. The system of claim 11, wherein the first intermediary device is further configured to identify a routing domain of the first packet.

14. The system of claim 12, wherein the first intermediary device is further configured to include the routing domain as input to the first hash.

15. The system of claim 12, wherein the first intermediary device is further configured to include the routing domain in the header of the second packet.

16. The system of claim 12, wherein the routing domain identifies a domain of an entity of a plurality of different entities having network traffic traversing between the first intermediary device and the second intermediary device.

17. The system of claim 11, wherein the first intermediary device is further configured to populate the header of the second packet with a second source IP address of the first intermediary device and a second destination IP address of the second intermediary device.

18. The system of claim 11, wherein the header of the second packet comprises a unigram data protocol (UDP) header.

19. The system of claim 11, wherein the protocol comprises an internet protocol (IP) protocol.

20. The system of claim 11, wherein packets via different transport layers connections between the client and the server transmitted from the first intermediary device via the tunnel are transmitted via different paths of the plurality of paths to the second intermediary device.

* * * * *